F. D. RUGG.
SHOVEL.
APPLICATION FILED JULY 26, 1915.
1,207,634.
Patented Dec. 5, 1916.
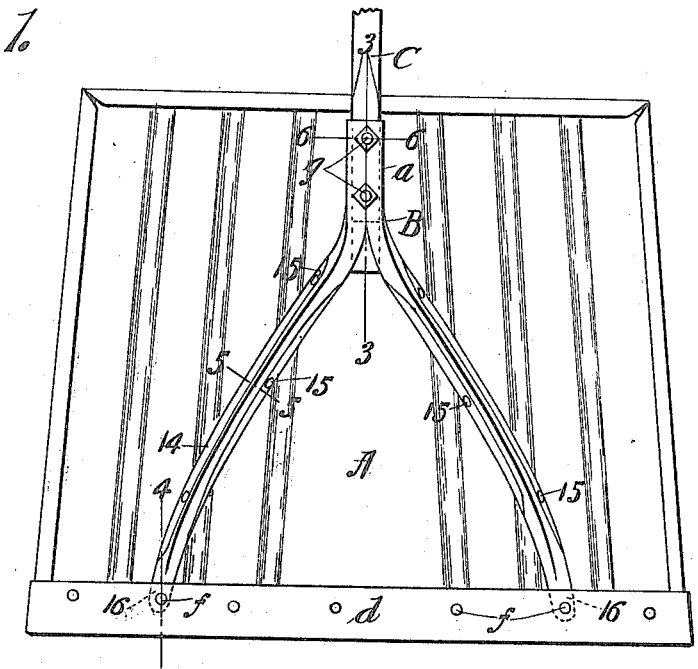
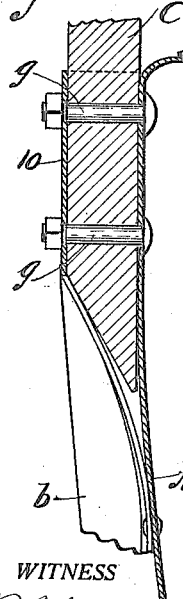
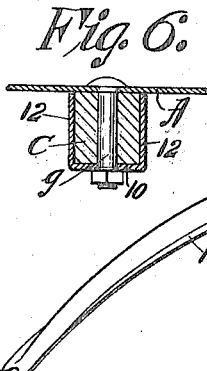
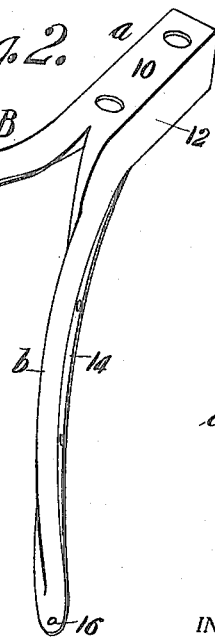
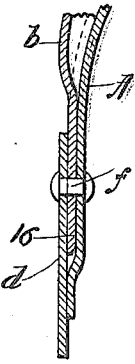
WITNESS
B. A. Seaver.
INVENTOR,
Frank D. Rugg,
BY
ATTORNEY.

UNITED STATES PATENT OFFICE.

FRANK D. RUGG, OF GREENFIELD, MASSACHUSETTS.

SHOVEL.

1,207,634.      Specification of Letters Patent.      Patented Dec. 5, 1916.

Application filed July 26, 1915. Serial No. 41,936.

*To all whom it may concern:*

Be it known that I, FRANK D. RUGG, a citizen of the United States of America, and resident of Greenfield, in the county of Franklin and State of Massachusetts, have invented certain new and useful Improvements in Shovels, of which the following is a full, clear, and exact description.

The object of this invention is to improve the construction of a shovel in respect to the simplicity, practicability and inexpensiveness of manufacture thereof, in respect to production of the implement of great strength, stability, durability and lightness, and in respect to the provision of a new article of manufacture of great efficiency for use, and of unusual acceptability and desirability in the trade.

The improvements carrying out the objects of the invention especially reside in the formations of prongs downwardly divergently extended relatively to a socket piece for the handle, from which such prongs are continued as integral extensions, and which prongs are secured to the blade; furthermore, in the shape of the prongs; and in other contributing structural features; all as hereinafter described in conjunction with the accompanying drawings, and as comprehended in and by the claim.

In the drawings:—Figure 1 shows a rear face view of the improved shovel; Fig. 2 is a perspective view of the combined handle socket piece and trough shaped ribs formed as divergent continuations of the socket piece. Fig. 3 is a partial longitudinal section on line 3—3, Fig. 1. Fig. 4 is a partial longitudinal section on line 4—4, Fig. 1. Fig. 5 is a partial transverse section on line 5—5, Fig. 1. Fig. 6 is a partial transverse section on line 6—6, Fig. 1.

I will now describe with particularity the improved shovel as the same has been constructed in its preferred form, it being stated, however, that the invention is susceptible of considerable change in the form of some of the parts within the scope of the appended claim and without departure from the invention.

In the drawings, A represents the blade of a snow shovel or scoop shovel, the same as understood being of wood, or metal, such as thin steel, or galvanized iron.

The blade is comparatively broad and in many cases is of curved form.

B represents an appliance which comprises both a handle attachment socket piece and blade stiffening and reinforcing means. The socket portion $a$ of the said appliance B comprises a back 10 and opposite side walls 12, 12, to form a cross sectionally trough shaped shank in extension of which are the downwardly convergently extended prongs $b\ b$. These prongs integrally made with the socket piece $a$ as shown, are of a cross sectional trough shape, downwardly decreasing in depth, and having the mouth portions thereof in contact on and secured to the back of the shovel blade. Each said prong $b$ of the trough shape, preferably cross sectionally in the form of a V, has at the mouth portions thereof one or more outward flange extensions 14, 14, for contact on the blade and through which by rivets 15 the connection of the bases of the rib prongs with the blade is made. The trough shaped and flanged-provided prong-like ribs $b$ have their lower end portions extended in the form of flat lips 16, 16,—down to which the trough-shaped rib prongs taper; and said portions 16, conforming to the face of the shovel blade are secured thereto in any suitable manner as by rivets.

$d$ represents a metallic reinforcing strip secured by rivets $f\ f$ transversely on the forward edge portion of the shovel blade, and between which strip and the blade the aforementioned flat extensions 16, 16, are disposed, certain of the ribs $f$ which connect the strip $d$ also serving to make the connection of the said extremities 16 of the rib forming prongs. The said thin metallic portion $d$, forming a wear strip at the edge of the shovel also conceals and forms a guard and protector to the said flat end portions of the prongs $b$.

The shank member $a$ by the back 10 and opposite side members 12, 12, edgewise in conjunction with the back of the shovel blade at the central longitudinal line of the latter, form as here shown a cross sectionally rectangular socket in which the lower end portion of the handle is fitted and secured; and bolts or rivets $g\ g$ are passed transversely through the back 10 of the socket piece, the handle C, and the blade $b$.

The handle attachment socket piece or shank $a$ of which the rib prongs are integral divergent continuations, instead of being transversely cross sectionally rectangular may be of complete or partially circular or other cross sectional shape; and while the downwardly divergent rib prongs of downwardly decreasing depth and integrally continuous of the socket piece are preferably cross sectionally of the V trough form shown, they may be of a trough shape of modified cross sectional contour.

I claim:—

In a shovel, a blade, a socket piece comprising an integrally formed back and opposite side members, to form an upwardly open socket, and said socket piece being continued in integral downwardly divergent prongs made cross sectionally of trough form of downwardly decreasing depth, the handle inserted in the socket piece, fastenings extending through the socket piece, the handle and the blade, and fastenings extending through and connecting the prongs and the blade.

Signed by me at Springfield, Mass., in the presence of a subscribing witness.

FRANK D. RUGG.

Witness:
G. R. DRISCOLL.

Copies of this patent may be obtained for five cents each, by addressing the "Commissioner of Patents, Washington, D. C."